F. H. MILLER.
MICROMETRIC INDICATOR.
APPLICATION FILED APR. 12, 1920.

1,388,739.

Patented Aug. 23, 1921.
2 SHEETS—SHEET 1.

Inventor:
Frank H. Miller
By Young & Young
Attorneys

F. H. MILLER.
MICROMETRIC INDICATOR.
APPLICATION FILED APR. 12, 1920.

1,388,739.

Patented Aug. 23, 1921.
2 SHEETS—SHEET 2.

UNITED STATES PATENT OFFICE.

FRANK H. MILLER, OF RACINE, WISCONSIN.

MICROMETRIC INDICATOR.

1,388,739.   Specification of Letters Patent.   Patented Aug. 23, 1921.

Application filed April 12, 1920. Serial No. 373,088.

*To all whom it may concern:*

Be it known that I, FRANK H. MILLER, a citizen of the United States, and resident of Racine, in the county of Racine and State of Wisconsin, have invented certain new and useful Improvements in Micrometric Indicators; and I do hereby declare that the following is a full, clear, and exact description thereof.

My invention relates to new and useful improvements in measuring instruments and pertains particularly to micrometers.

As micrometers are at present constructed it is quite easy for the user to make a mistake in reading the same owing to the minuteness of the graduations on the barrel and thimble. Therefore it is the most important object of this invention to provide an arrangement for more graphically recording measurements on a micrometer than is possible by means of standard structures.

An additional object of the invention is to provide an instrument of this character which will simultaneously record the fractional and decimal portions of a particular unit of measurement.

Still another object of the invention is to provide a simply constructed recording means which can be largely inclosed in a suitable housing carried by the micrometer frame and operated by the spindle of the micrometer.

With these general objects in view, the invention resides in the novel features of construction, combination and arrangement of parts which will be hereinafter more particularly described and claimed.

In the accompanying drawing:

Fig. 3 is a similar view showing the indicating mechanisms in elevation, and

Figure 1:
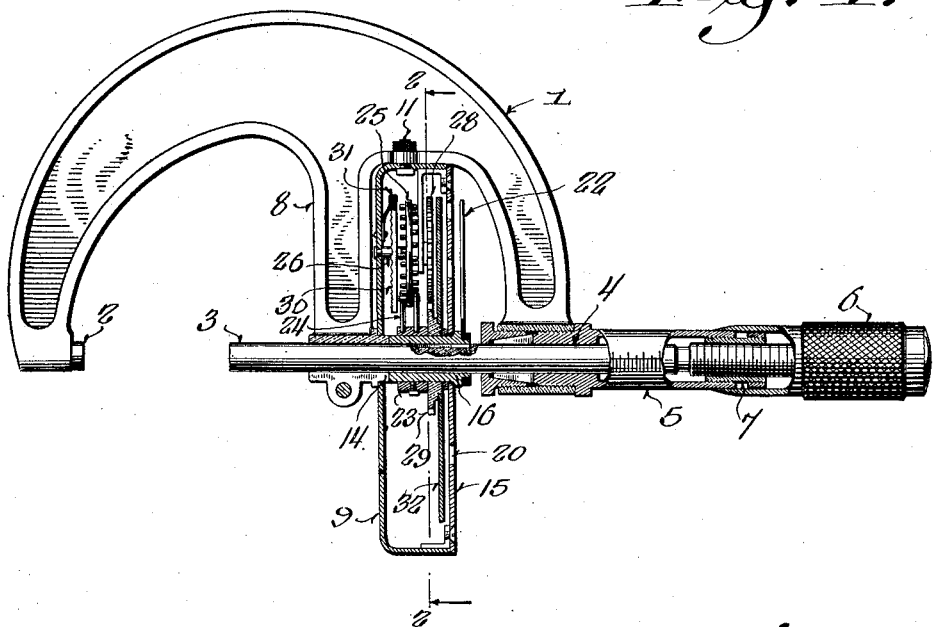
Figure 1 represents an elevational view, partly in section, of a micrometer constructed in accordance with the invention.
Figure 2:
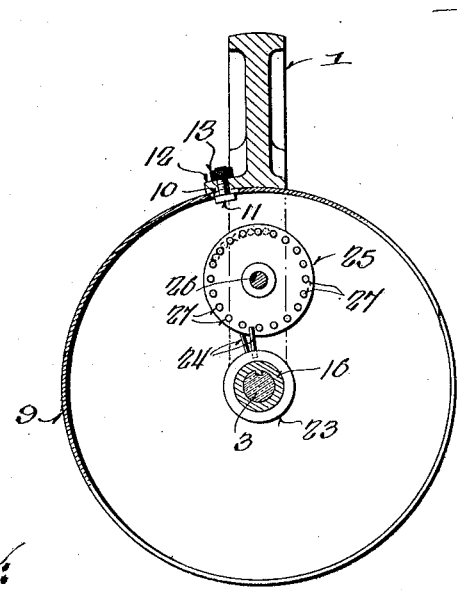
Fig. 2 is a transverse sectional view taken approximately on the plane of the line 2—2 of Fig. 1.
Figure 5:
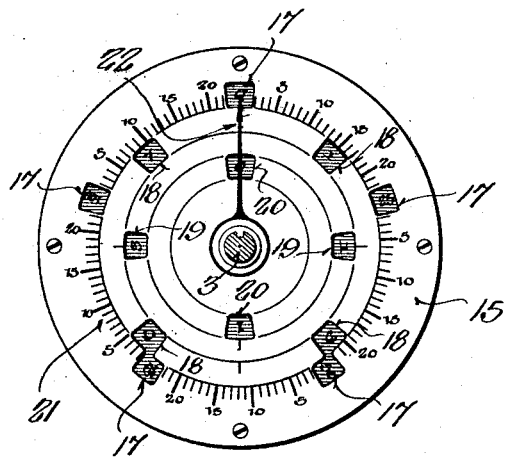
Figure 4:
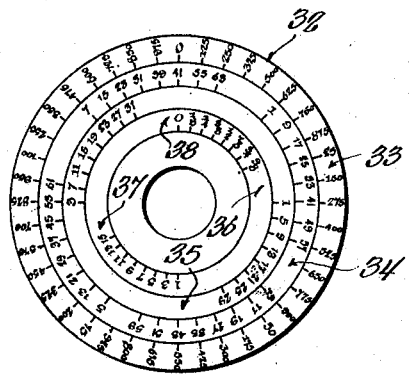
Fig. 4 is a plan view of the rotatable dial plate on which series of graduations are marked.

Referring more particularly to the accompanying drawings, it will be seen that a considerable number of parts of the micrometer with which my improvements are associated are standard. For instance, as will be seen from Fig. 1, the same includes a frame 1 having an anvil 2 at one end with which the end of a spindle 3 coöperates, the same being movable through a bearing 4 at the other end of the frame. This bearing 4 forms one part of a barrel 5 on which a thimble 6 rotates, the latter having the spindle 3 connected therewith and threaded through a nut 7 in one end of the barrel. As is customary, the barrel is provided with a longitudinal series of graduations with which the barrel engaging end of the thimble coöperates, said end having an annular series of graduations. By turning the thimble 6, the free end of the spindle is obviously moved toward or away from the anvil 2, and the article to be measured is clamped therebetween.

In accommodating standard micrometer structures to my invention, I add a supplemental leg 8 to the frame 1 and extend the spindle 3 through a bearing carried thereby. Between the leg 8 and the end of the frame 1 which carries the bearing 4 is secured a relatively flat circular casing 9, the annular wall of which is provided with a slot 10 through which an adjustable clamping bolt 11 extends. This bolt is carried by an ear 12 of the frame 1 so that upon movement of a thumb nut 13 on the shank of the bolt 11, the casing 9 may be locked to the frame. The flat circular sides of the casing 9 are provided with central apertures through which the spindle 3 extends, the wall of the aperture in the rear side of the casing being supported upon an extending portion 14 of the bearing which is carried by the leg 8. The front side of the casing which forms a dial 15 has the wall of its central aperture engaged with a sleeve 16 which is keyed to the spindle 3 for rotation therewith.

The dial 15 has a plurality of rings of sight openings, the outermost ring having five openings 17, the next ring inwardly thereof including four sight openings 18, the third ring having two openings 19 and the innermost ring a similar number of openings 20. The surface of the dial within each of the rings and between the sight openings thereof may be provided with suitable graduations, for instance as illustrated by the graduations designated by the reference character 21. In this case an independent series of graduations 21 is marked between each of the sight openings 17. The sleeve 16 carries a pointer 22 for coöperation with the individual graduations of the series 21 or those which may be located between the sight openings on the other rings.

Within the casing 9 and locked upon the sleeve 16 is a collar 23 from which a pair of radially projecting fingers 24 extend, these fingers being in longitudinal planes which are relatively close together and in transverse planes that are slightly spaced apart. A drive wheel 25 is journaled upon a shaft 26 carried by the casing 9, and projecting from each side is a circle of pins 27. In the present instance there are twenty pins extending from each side of the wheel 25 and those on one side are staggered with respect to those on the other. The fingers 24 being spaced apart a sufficient distance to receive the wheel 25 therebetween are designed to alternately engage the pins on opposite sides of the former. Thus as the collar 23 is rotated one complete revolution, one of the fingers 24 will engage a pin 26 and move the wheel slightly; then on the next revolution of the collar, the other finger 24 will contact with a pin 27 on the opposite side of the wheel and move the same a farther predetermined distance.

Connected with the drive wheel 25 for rotation therewith is a spur-gear 28, the teeth of which mesh with the teeth of a pinion 29 journaled on said sleeve 16. A holding mechanism is provided within the casing 9 to prevent movement of the drive wheel 25 except upon engagement of the pins thereof with the fingers 24, and this includes a detent ring 30 and a detent spring 31. A circular dial plate 32 is fixed to the pinion 29 so as to rotate therewith.

This dial plate is located within the casing 9 behind the dial 15 so that the numbers or other symbols thereon may be seen through the sight openings 17, 18, 19 and 20. To correspond with the rings of the sight openings on the dial 15, the dial plate 32 is provided with four circles of graduations, the outermost circle 33 being adapted to have its numerals alined with the sight openings 17, the numerals of the second circle 34 being for registration with the sight openings 18, the third circle 35 being for co-operation with the sight openings 19, and the series of numbers on the fourth or innermost circle 36 being adapted to co-act with the sight openings 20. The numbers of the outermost circle 33 of graduations are designed to read thousandths of an inch and are arranged in five series, one series starting with zero, the second series with twenty five, the third series with fifty, the fourth series with seventy five, and the fifth series with one hundred. The numbers in each of these series are so arranged that proper registration with the sight openings 17 is procured.

The numbers on the second circle 34 designate sixty-fourths of an inch and it will be seen that there are four series, each starting with a different number, for registration with the four sight openings 18. The third circle 35 has two series of numbers which represent thirty-seconds of an inch and these series are adapted to be brought into registration with the sight openings 19. In the innermost circle 36 are two series of numbers, one series designated by the reference character 37 being adapted to represent sixteenths of an inch and to be registered with one of the openings 20. The other series of numbers on this innermost circle 36 is designated by the character 38 and represents eighths of an inch. The other sight openings 20 have the numbers of this series 38 registered therewith.

In reading an ordinary micrometer, the number of twenty-five thousandths of an inch which the spindle end is spaced from the anvil is determined by the longitudinal series of graduations on the barrel 5, and the number of thousandths of an inch over this total is shown by the annular series of graduations on the end of the thimble. In the present invention the sight openings 17 and the numbers on the circle 33 of the dial plate 32 graphically illustrate the number of twenty-five thousandths of an inch which the end of the spindle is spaced from the anvil 2 as is ordinarily shown by the longitudinal series of graduations on the barrel 5. In other words, as the spindle 3 is rotated, movement at a different rate of speed is imparted to the dial plate 32 through the fingers 24, the drive wheel 25, the gear 28, and the pinion 29 so that when the spindle comes to rest, one of the numbers on the circle 33 of the dial plate is alined with one of the sight openings 17. Simultaneously with the movement of the dial plate 32, the pointer 22 is moved, but at the same rate of speed as the rotation of the spindle 3 as it is connected directly thereto. The pointer 22 will be located adjacent one of the sight openings 17 and in alinement with one of the graduations in one of the series 21. Therefore to read the mechanism in thousandths of an inch, the number which appears through the sight opening 17 to which the pointer 22 is closest plus the number of graduations in one of the series 21 with which said pointer is alined represents the number of thousandths of an inch which the end of the spindle 3 is spaced from the anvil 2. In other words the pointer 22 together with the series of graduations 21 correspond with the series of graduations on the end of the thimble 6 as hereinbefore referred to.

By providing the other circles 34, 35 and 36 on the dial plate 32 and the additional sight openings 18, 19 and 20 in the dial 15, the fractional equivalents of the thousandths of an inch shown through the openings 17 is apparent at a glance at the indicating mechanism. In other words with this mechanism corresponding decimal and fractional portions of an inch are simultaneously recorded.

Various changes may be made in the different parts of the invention for carrying out the primary objects thereof without departing from the obvious advantages or sacrificing any of the principles as outlined in the following claims.

I claim:

1. In a measuring instrument including an extensible and retractable spindle, a relatively stationary dial having a series of sight openings therein, a dial plate having a series of graduations, said plate being rotatable to aline the graduations with the sight openings, and means operable by the rotation of the spindle for moving the dial plate to record the amount of movement of said spindle.

2. In a measuring instrument including an extensible and retractable spindle, a relatively stationary dial having a series of sight openings therein, a series of graduations, a dial plate having a series of graduations, said plate being rotatable to aline the graduations with the sight openings, means operable by the rotation of the spindle for moving the dial plate with respect to the dial, and a pointer operable by the rotation of the spindle and adapted to be alined with the series of graduations on the dial.

3. In a measuring instrument including an extensible and retractable spindle, a relatively stationary casing having one side forming a dial, said dial having a plurality of sight openings, and a series of graduations, a dial plate disposed within the casing and having a series of graduations adapted to be alined with the sight openings of the dial, means operable by the rotation of the spindle and located within the casing for moving the dial plate, and a pointer carried by the spindle and located exteriorly of the casing for coöperation with the series of graduations on the dial.

In testimony that I claim the foregoing I have hereunto set my hand at Racine, in the county of Racine and State of Wisconsin.

FRANK H. MILLER.